Jan. 11, 1949.  R. G. STONER ET AL  2,458,882
TIMING DEVICE FOR HIGH SPEED
MOTION-PICTURE CAMERAS
Filed Oct. 4, 1945
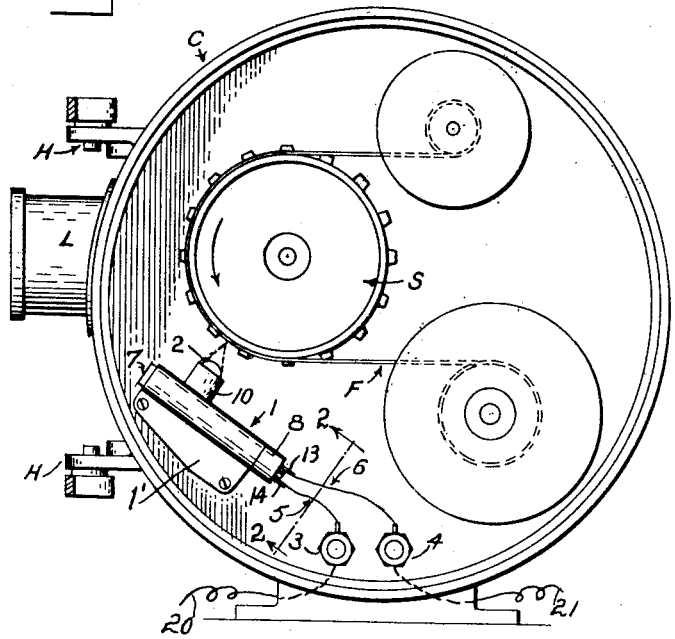
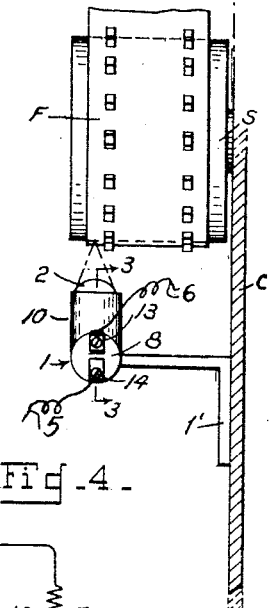
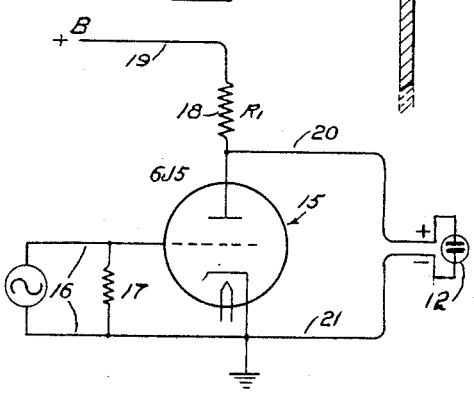
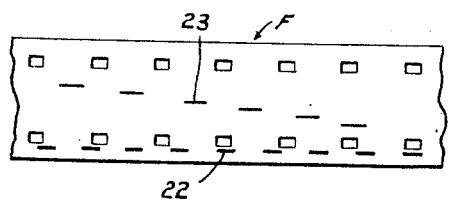
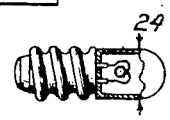
Inventors
Richard G. Stoner
Curtis W. Lampson
By J. H. Church & H. E. Thibodeau
Attorneys Patented Jan. 11, 1949

2,458,882

UNITED STATES PATENT OFFICE 2,458,882

TIMING DEVICE FOR HIGH-SPEED MOTION-PICTURE CAMERAS

Richard G. Stoner and Curtis W. Lampson, Princeton, N. J., assignors to the United States of America as represented by the Secretary of War Application October 4, 1945, Serial No. 620,344

1 Claim. (Cl. 346—107)

In investigating physical phenomena with the aid of high speed motion picture cameras, it is often desirable to be able to ascertain to a high degree of accuracy, the elapsed time between two or more events depicted upon the film.

It is a purpose of this invention to provide an attachment for a high speed motion picture camera whereby a time record is produced upon the film enabling very small time intervals between any two events depicted thereon to be determined.

It is a further object to provide an attachment, as aforesaid, that requires only minor changes in the camera itself and that in no way interferes with the use of the camera without the attachment, when desired.

Another object is to provide an attachment wherein the time record appears upon a portion of the film ordinarily not used for recording events.

A still further object is to provide a time-recording attachment for motion picture cameras of the type wherein the film is continuously moved, wherein the time interval measured may be widely varied so that the most favorable interval for the events to be depicted may be selected.

Another object is to provide a time-recording attachment for motion picture cameras that is relatively inexpensive, easy to construct and attach, and extremely reliable in operation.

Other objects and advantages of the invention will become apparent as the description proceds.

In the drawings:

Fig. 1 shows a portion of a motion picture camera with side cover removed to illustrate the general arrangement of lens, film, sprocket, and timing projector, Fig. 2 is a view on line 2—2 of Fig. 1, of a portion of the sprocket and projector showing the positioning of the projector transversely of the film, Fig. 3 is an enlarged section taken upon the line 3—3, Fig. 2 and showing the projector casing, lamp, lens and contact terminals, Fig. 4 is a diagram of the tube and circuit used to periodically flash the projector lamp at predetermined time intervals, Fig. 5 is a view of a section of exposed film showing the time trace thereon, and Fig. 6 is a view, partly in section, showing the manner in which a lens satisfactory for use in the projector, may be obtained.

At C is indicated a portion of the casing of a high-speed motion picture camera having a back wall, a cover, hinged at H, and a prism lens L adapted to be rotated, by mechanism not shown, in timed relation with movement of a film F passing continuously over and about a support or sprocket wheel S. The numeral 1 indicates the casing of a neon lamp, fixed in any suitable manner to the wall of the camera (as, by a bracket 1' having a foot flange secured to the back wall of the camera, as shown) and having a lens 2 positioned closely adjacent the film so as to project light onto the space between one edge of the film and the adjacent row of sprocket openings therein, all as is clearly indicated in Fig. 2, where it may be seen that the lens is a converging lens projecting a pencil of rays to a point at the film. Insulated terminals 3 and 4 are secured through one side of the camera wall whereby to provide external connections for leads 5 and 6 for the lamp-flashing circuit.

Referring to Fig. 3, the lamp casing may consist of a section of metallic tubing 1, closed at one end by a plug 7 and at its other end by an insulating plug 8. A small hole or light port 9 such as that made by a #55 drill, is bored through the lamp casing wall at a point approximately mid-way between the ends of the casing, and a lens holder 10 is secured to the casing concentric with hole 9. This holder may consist of a short section of metallic tubing of the same diameter as casing 1 and shaped at one end to fit the casing. The holder is secured to the casing 1 in any convenient manner, as by soldering. The outer end of the holder 10 is counterbored as at 11 to receive the lens 2 which may be secured in place by spinning the reduced wall of the holder about the adjacent portion of the lens.

The insulating plug 8 has a reduced portion fitting within the end of casing 1 and secured therein by threading, rivets or any other suitable means. The plug 8 receives therethrough the internal connector wires from the electrodes of a small neon or argon lamp 12 having a fairly snug fit within casing 1. Terminals 13 and 14 are secured to the outer end of the plug 8, and the connector wires are attached thereto, whereby soldering connections may be made with intermediate external lamp leads 5 and 6 extended to the terminals 3 and 4 as in Fig 1. A lamp 12 of 1/25 watt size was found satisfactory in one installation built and successfully operated.

The flashing circuit for lamp 12 is shown at Fig. 4. A triode 15 of the heater cathode type, such as the 6J5, is connected in a modulating circuit having an input 16 to apply an alternating voltage of the desired frequency to the gird and has a parallel connected resistor 17. A second resistor 18 is connected in series to the plate through the "B" circuit 19. A lead 20 extends from a connection between resistor 18 and the plate, to terminal 3 on the camera, while a second lead 21, extends from the cathode to terminal 4. When the grid potential rises to the point where the tube conducts, the flow of plate current creates a voltage drop across resistor 18 to thus extinguish the lamp 12. During the part of the cycle that the grid is below cut-off, the plate voltage rises and the lamp is lighted to thereby expose the film and form thereon a short dash having sharply-defined ends. Fig. 5 shows a film F wherein the exposed dashes are indicated at 22 in conjunction with the image 23 of a rapidly moving object such as an indicator.

By applying an alternating voltage to input 16 having a known frequency, the time interval between dashes upon the film is known exactly and may be used to measure the intervals between events depicted upon the film with a high degree of accuracy. For example, where a 1000-cycle control signal is used, time intervals to 0.1 milliseconds may be estimated. Furthermore, the time between exposures may be computed, as well as the speed of the film.

Fig. 6 shows one manner of obtaining a suitable lens. The bulb of a flashlight of the fountain pen type is cut off along the plane indicated at 24. The lens thus obtained will have a focal length of about 6 mm. and when used to give unit magnification, allows an overall distance of source to image of about 30 mm.

The operation will be obvious from the foregoing description. Actual tests of the model selected for description indicate that successful operation is possible at film speeds up to at least 8300 feet per second.

While we have disclosed a specific embodiment of our invention as it is now known to us, various modifications, rearrangement of parts, and substitutions of equivalents, will occur or be obvious to those skilled in the art. Hence the foregoing description is to be taken in an illustrative and not a limiting sense; and we wish to reserve all such modifications and substitutions as fall within the scope of the sub-joined claim.

Having now fully disclosed our invention, what we claim as new and desire to secure by Letters Patent is:

In a high speed photo film strip moving picture camera, a timing device to produce a time calibration record on the film strip while passing through the camera comprising an opaque closed hollow cylinder having a mounting bracket attachable to the wall of a camera adjacent the film path, said cylinder having a light port therein on a radius of the cylinder distant from said bracket, a gaseous electric discharge light source in said cylinder responsive to high frequency intermittent electrical discharges to propagate correspondingly intermittent light rays through said port, said cylinder having a lateral tubular extension concentric with the said radius of the cylinder, and a converging lens mounted in said tubular extension.

RICHARD G. STONER.
CURTIS W. LAMPSON.

REFERENCES CITED

The following references are of record in the file of this patent:

UNITED STATES PATENTS

| Number | Name | Date |
|---|---|---|
| 1,599,538 | Mintrop | Sept. 14, 1946 |
| 2,045,414 | Rumpel | June 23, 1936 |
| 2,077,390 | Blaw | Apr. 20, 1937 |

FOREIGN PATENTS

| Number | Country | Date |
|---|---|---|
| 569,475 | France | Apr. 12, 1924 |
| 604,860 | France | Mar. 15, 1926 |